March 1, 1949.　　　　L. C. IVES　　　　2,462,868
AUTOMOTIVE TRUCK BED
Filed April 5, 1946　　　　　　　　　　3 Sheets-Sheet 1
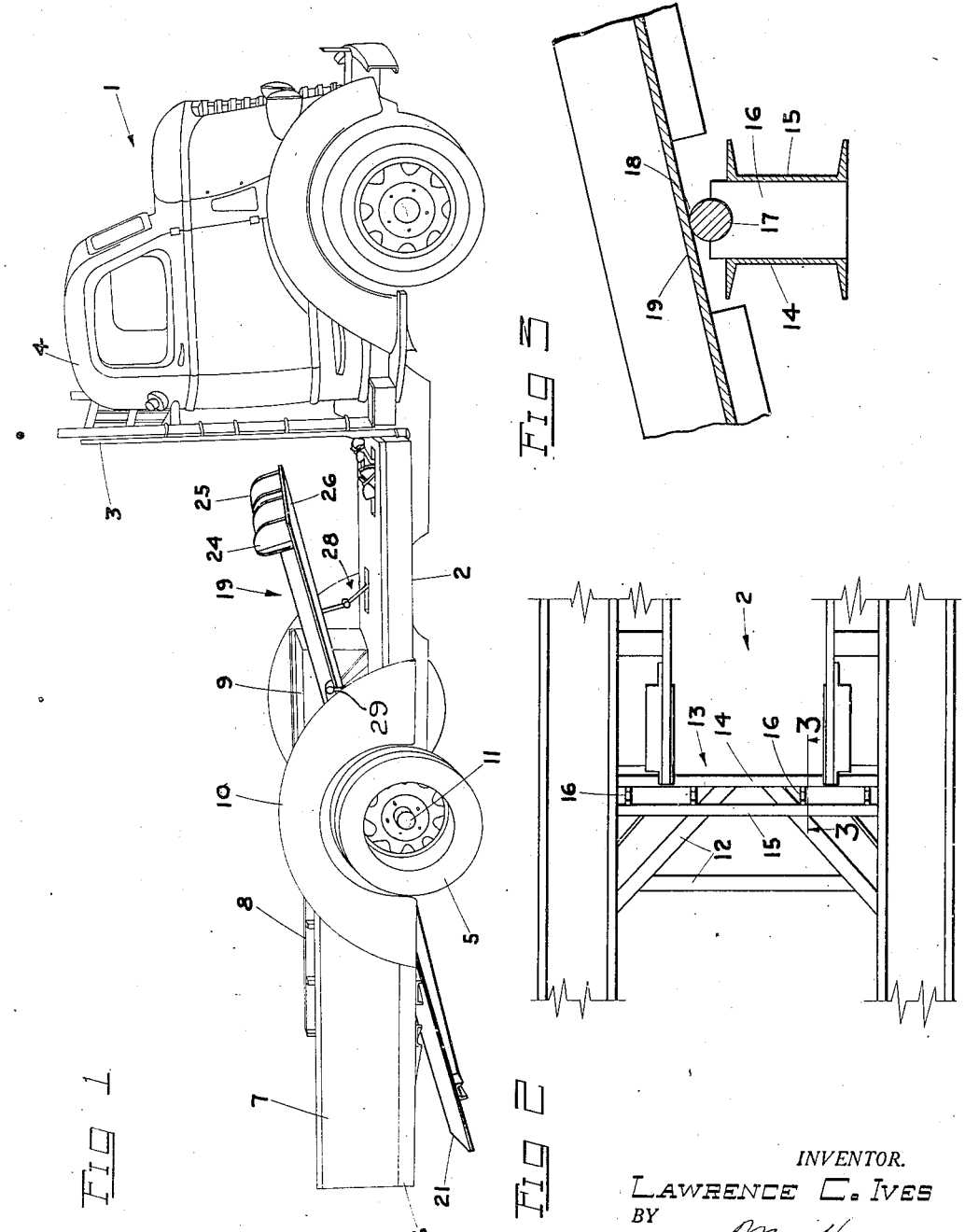
INVENTOR.
LAWRENCE C. IVES
BY
ATTORNEY.

March 1, 1949.  L. C. IVES  2,462,868
AUTOMOTIVE TRUCK BED
Filed April 5, 1946  3 Sheets-Sheet 2

INVENTOR.
LAWRENCE C. IVES
BY
M. A. Hayes
ATTORNEY.

March 1, 1949.          L. C. IVES          2,462,868
AUTOMOTIVE TRUCK BED
Filed April 5, 1946                    3 Sheets-Sheet 3
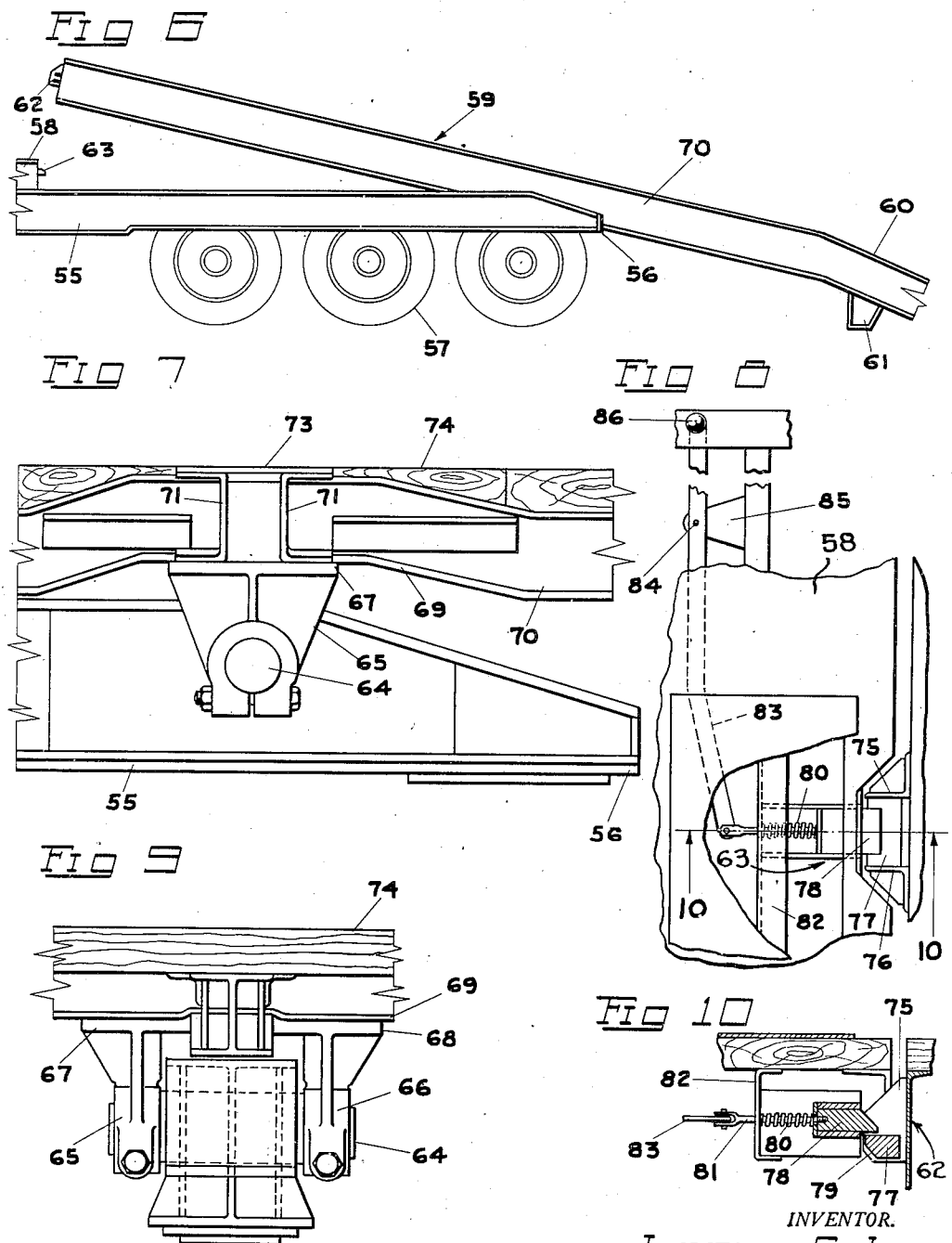
INVENTOR.
LAWRENCE C. IVES
BY
*M. A. Hayes*
ATTORNEY Patented Mar. 1, 1949

2,462,868

UNITED STATES PATENT OFFICE 2,462,868

AUTOMOTIVE TRUCK BED

Lawrence C. Ives, New York, N. Y.

Application April 5, 1946, Serial No. 659,736

6 Claims. (Cl. 214—85)

(Granted under the act of March 3, 1883, as amended April 30, 1928; 370 O. G. 757)

This invention relates to automotive truck beds and more particularly to a combination loading ramp and floor piece therefor.

It is desirable to load trucks or other vehicles without reliance on equipment such as cranes, loading platforms, or portable ramps, not a unit part of the carrying vehicle. This is particularly true where ease, speed and economy are desired in the field, where the more conventional loading equipment may not be readily available.

Objects of this invention are to provide a unit loading and transporting vehicle; to provide a pivotally mounted ramp; to provide a facile, economical and efficient vehicle loading apparatus; and to provide improved elements and arrangements thereof in a mechanism of the character described.

In accomplishing these and other objects of the present invention, I have provided improved details of structure, the preferred forms of which are illustrated in the accompanying drawings, wherein:

Fig. 1 is a side elevational view of a truck having a pivotal ramp or floor piece.

Fig. 2 is a plan view of a portion of the truck chassis, Fig. 1, having a saddle pivot support for said ramp or floor piece.

Fig. 3 is a vertical cross-sectional view taken along the line 3—3, Fig. 2.

Fig. 6 is a fragmentary vertical cross-sectional view of a heavy duty truck trailer showing a modified form of my improved loading ramp applied thereto.

Fig. 7 is a fragmentary side elevational view, partly in vertical cross-section, of the ramp pivot.

Fig. 8 is a plan view of the latching mechanism for my improved ramp, parts of the ramp being broken away to better illustrate the construction of the latch.

Fig. 9 is an end elevational view of the ramp pivot taken substantially at right angles to Fig. 7.

Fig. 10 is a detail vertical cross-sectional view of the latching mechanism for my modified form of ramp.

Figure 4:
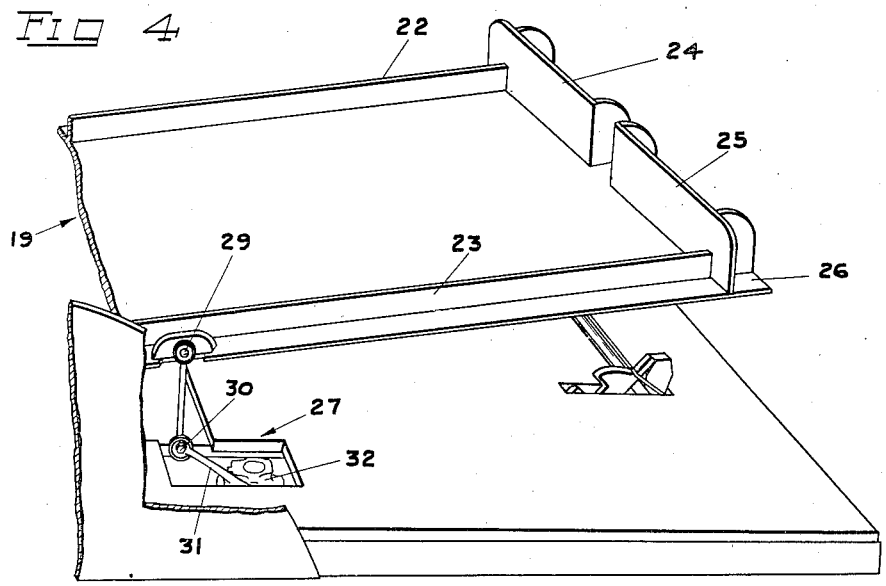
Fig. 4 is a detail perspective view showing the forward end of the pivotal ramp, a portion of a latching device and the arms of a snubber unit.

Referring more in detail to the drawings:

In Fig. 1, 1 designates a truck of suitable make, that is preferably provided with a chassis having a horizontally disposed bed 2 extending rearwardly from a vertical partition 3 adjacent the cab 4 of the truck and terminating substantially at the rear of the rear wheels 5 of the vehicle, as indicated at 6. If desired, side walls 7 and 8 may be provided at the rearwardly arranged portions of the bed 2, such side walls preferably terminating at their forward ends, in box like structures 9 that cooperate with shields 10 in housing the rear wheels 5 of the truck.

Mounted on the bed 2 of the truck adjacent the rear axle 11 of the truck and supported by suitable bracing and cross bracing 12, is a transversely arranged horizontally disposed seat 13, Fig. 2, that preferably comprises opposed channel irons 14 and 15, Fig. 3, suitably supported by the bed 2 of the truck. The channel irons 14—15 have mounted thereon a spaced series of saddles 16 that have upwardly opening recesses to seat and support a pivot bar 17 that is suitably secured, as by welding 18, to the lower surface of a ramp 19.

The ramp 19 preferably comprises an auxiliary floor piece of a length and width adapted, for example, to support fork lift trucks and other vehicles smaller than the truck bed itself. As indicated in Figs. 1 and 3, the ramp 19 is pivotally supported by the truck bed 2, one end 21, Fig. 1, of the ramp being adapted to engage the ground or other support in such a manner that the vehicle to be hauled by the truck 1 may be driven up the ramp 19. The ramp 19 may be provided with side walls 22 and 23 to aid in guiding the vehicle to be hauled up the ramp. End pieces 24 and 25 are provided at the forward end of the ramp to constrain the vehicle against rolling into the vertical partition 3 of the truck. The end pieces 24 and 25 are preferably set back from the forward edge 26 of the ramp in such a manner as to provide a lip to serve as a latching element as later more clearly described.

In order to control pivotal movement of the ramp 19, snubbers 27 and 28 are preferably provided, the snubbers comprising arms, one of the ends of each of which are pivoted to the ramp forwardly of the pivot bar as indicated at 29 and the ends of which are pivotally connected, as at 30, Fig. 4, with arms 31 leading to control mechanisms 32 for allowing raising and lowering of the ramp with predetermined resistance.

When a vehicle to be hauled by the truck is run up the ramp, it is apparent that the forward end 26 of the ramp lowers from its position shown in Fig. 1 to the plane of the truck bed 2. In order to positively secure the ramp in lowered horizontal position, I have provided a latch, the preferred form of which is illustrated in detail in Fig. 5. This latch preferably comprises a transversely arranged, horizontal bar 33 having its ends pivotally secured in the side rails 34 and 35 of the truck bed 2 and having spaced latching blocks 36 and 37 fixed to the bar 33. The blocks 36 and 37 are provided with rearwardly opening recesses 38 and 39 that are adapted to receive or encompass the forward or leading edge 26 of the ramp 19 when the bar 33 is pivoted in a counterclockwise direction relative to Fig. 5. To move the blocks 36 and 37 into latching position, the upper ends thereof are preferably curved arcuately as at 40 and provided with upstanding lugs 41 and 42 upon which links 43 and 44 are hooked. The links 43 and 44 are pivotally connected to bearing blocks 45 and 46. The bearing blocks 45 and 46 are mounted, as by welding, on a pivotal cross rod 47 which sleeves within a tube 48 that is fixed, as by welding, on the center truck bed portion 49 of the bed 2. One end of the shaft 47 is provided with a handle member 50 by which the shaft 47 may be rotated to cause the bearing surfaces of the bearing blocks 45 and 46 to engage the lugs 41 and 42 and force them in the direction of the leading edge of the ramp or, upon reversal of direction of motion of the handle 50, cause the links 41 and 42 to pull the latching elements 36 and 37 out of engagement with the said leading edge of the ramp.

Operation

Figure 5:
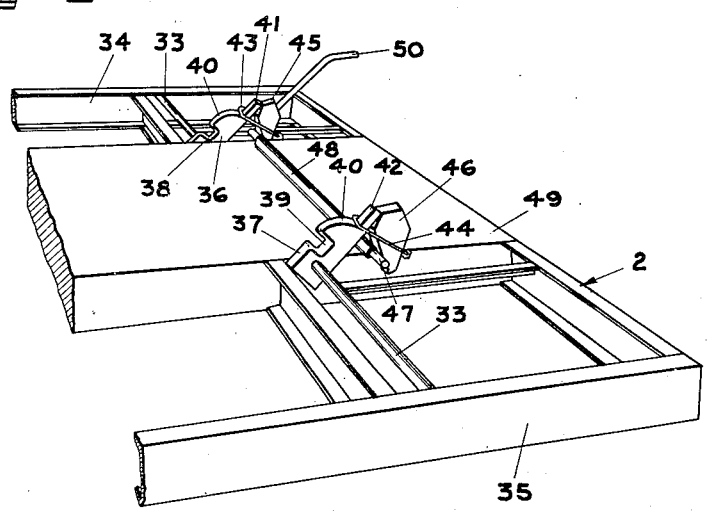
Fig. 5 is a detail perspective view of the latching device.

The operation of an apparatus constructed as described is as follows:

Assuming the ramp 19 to be in the condition shown in Fig. 1, a fork lift truck or other vehicle of smaller size than the ramp is driven up the ramp toward the forward end thereof, approach to which causes the ramp to swing downwardly against action of the snubbers to a horizontal position in contact with the truck bed. The handle 50, Fig. 5, is then moved to the left relative to Fig. 5, which causes the bearing blocks 45 and 46 to move the latching elements 36 and 37 into latching engagement with the forward edge 26 of the ramp. The ramp is thus locked in horizontal position and the weight of the vehicle being hauled aids the snubbers in holding the ramp on the truck body bed 2.

When it is desired to unload the hauled vehicle, the handle 50, Fig. 5, is moved to the right relative to Fig. 5. The shaft and bearing blocks draw the links to the right and consequently the latching elements to the right to unlock or unlatch the ramp. The hauled vehicle may then be backed off the ramp, the ramp pivoting against resistance of the snubbers to avoid shock and unintentional dislodging of the hauled vehicle. The hauled vehicle may then be moved under its own power to its desired location.

Modified form

In Figs. 6 to 10, a modified form of the present invention is illustrated, wherein 55 designates the bed of a heavy duty trailer, the rear end 56 of which is supported by suitable wheels 57 and the front end of which is suitably connected as at 58 with a tractor.

59 generally designates a floor piece for the trailer 55 adapted to tilt, as shown, to provide a ramp 60 at its rear end having a foot element 61 to support the same relative to the ground and having a latching element 62 at its forward end cooperatively engageable with a mating latching element 63 at the rear end of the hitch 58.

More particularly, the trailer 55 preferably comprises spaced parallel side rails that have suitable support on conventional axle members between the wheels 57, the said rails preferably being formed of I type beams that taper downwardly and rearwardly as indicated. Suitably journaled in the webs of the rails of the trailer 55 are transversely spaced horizontally aligned pivotally arranged shafts 64 on the opposite end of which are mounted bearing members 65 and 66. Head members 67 and 68 project upwardly from the bearings 65 and 66 in supporting relation to the laterally extending flanges 69 of I beams 70 that form a part of the side rail supporting members of the tiltable ramp 59. Channel members 71 are mounted in fixed relation on the head member 67 and are suitably braced relative thereto and in relation to the rail 70. The channels 71 are provided with caps 73, flush with floor boards 74 that complete the floor piece or bed of the tiltable ramp 59.

It is thus apparent that the tiltable ramp 59 is pivotally mounted adjacent the rear end of the heavy duty trailer 55 and is free to pivot to the position shown in Fig. 6 in such a manner as to allow vehicles to be run up on the ramp and trailer under the power of such vehicles. It will also be recognized that as such vehicles are driven up the ramp to the left relative to Fig. 6, that the weight of such vehicles forces the latch end of the ramp downwardly into the plane of the trailer 55.

In order to positively secure the ramp 59 in horizontal load carrying position, I provide a latching device as heretofore indicated, the preferred form of which is as follows:

The latching element 62, Fig. 6, preferably consists of transversely spaced, vertically arranged, angle iron brackets 75 and 76, Fig. 8, fixed as by welding to the forward end of the ramp 59 approximately in the center thereof. A horizontally disposed block 77, Fig. 10, is suitably secured between the opposite faces of the angle irons 75 and 76.

A nose 78 of the mating latching element 63, Fig. 6, is adapted to engage over the upper face of the block 77. The nose 78 is tapered substantially as shown in opposite relation to a taper 79 on the lower outer corner of the block 77 in such a manner that as the ramp 59 is lowered, the nose 78 is pushed to the left, Fig. 10, against action of the spring 80 on the shaft 81 secured to the nose 78. The spring 80 bears against a channel 82 so that as the tapered surface of the nose and block pass each other the nose is forced over the block to latch the ramp in lowered position.

An arm 83 is pivotally connected to the shaft 81 and extends toward one side of the trailer exteriorly of the side rails of the trailer. The arm 83 is pivotally mounted as indicated at 84, Fig. 8, on a bracket 85 and terminates at its outer end in a handle 86 by which the arm 83 and latch nose 78 may be manipulated.

Operation

The operation of the modified form of invention is as follows:

Assuming the trailer ramp to be in the condition shown in Fig. 6, automotive vehicles of less size than the trailer may be driven up the ramp and upon approaching the latch end 62 of the ramp cause the ramp to pivot downwardly to effect engagement of the block 77 of the ramp with the nose 78 of the latch 63, forcing the latter laterally and subsequently allowing spring latching engagement of the nose and block to positively latch the ramp in horizontal position.

When it is desired to move a hauled vehicle off the ramp, the handle 86 is moved to the right, Fig. 8, which, because of its pivot 84, moves the rod 81 to the left, Fig. 8, to effect unlatching of the ramp. The vehicle may then be driven under its own power toward the rear of the ramp which pivots under weight of such vehicle back to the position shown in Fig. 6, whereupon such vehicle may be driven off the ramp and disposed of as desired.

While I have shown certain embodiments of my invention, it is susceptible to further modification without departing from the spirit of the invention. I do not wish, therefore, to be limited by the disclosures set forth, but only by the scope of the appended claims.

The invention described herein may be manufactured and used by or for the Government of the United States of America for governmental purposes without the payment of any royalties thereon or therefor.

I claim:

1. In an apparatus of the character described, a tractor chassis having a rear axle, a saddle member supported by the tractor chassis adjacent the rear axle, a ramp pivotally mounted on said saddle member, one end of the ramp being engageable with the ground, stop members at the forward edge of the ramp, at least one latching block pivotally mounted on the truck chassis and having a recess in which the forward end of the ramp is engageable, a lug on the upper end of the recessed block, a bearing block pivotally mounted on the chassis having a bearing portion engageable with the lug to move the same in one direction, a link on the bearing block engageable with the lug to move the same in another direction, and means for moving the bearing block to effect latching and unlatching of the ramp relative to the truck chassis.

2. In combination, a vehicle and a floor piece mounted thereon to form a vehicle mechanism comprising said vehicle, a saddle support mounted on said vehicle, a cylindrical pivot rod rotatably mounted on said saddle support, a floor piece rigidly secured across its mid-section to the pivot rod, a latching mechanism comprising a handle; a rotatably mounted cam means, having flat bearing surfaces responsive to said handle; a linking means pivotally attached to said cam means; a pivotally mounted latching means abutted to and responsive to said cam means, linked by said linking means with grooving closely engageable over the edge of said floor piece.

3. In combination, a truck bed, a ramp pivotally mounted to said bed, a recessed latch member pivoted to said bed so that the recess thereof is engageable with said ramp to secure it against tilting on said bed, a cam pivoted to said bed having a substantially flat face engageable with said member when said member is pivoted into ramp-securing position, and means for pivoting said cam.

4. A tilting ramp for a truck bed comprising a ramp, means for pivotally mounting said ramp to a truck bed, a snubber connected to said ramp, and means for connecting said snubber to the truck bed.

5. In combination, a truck bed, a ramp pivotally mounted to said bed, a snubber connected between said ramp and said bed effective to provide damping resistance to pivoting of said ramp on said bed, and latch means connectible between said ramp and said bed for securing said ramp against pivoting on said bed.

6. In combination, a truck bed, a ramp pivotally mounted on said bed, resistance damping mechanism mounted on said bed, a pair of linkage arms pivoted together at their ends, the other end of one of said arms being pivoted to the underside of said ramp, and the other end of the second of said arms being pivoted to said resistance damping mechanism.

LAWRENCE C. IVES.

REFERENCES CITED

The following references are of record in the file of this patent:

UNITED STATES PATENTS

| Number | Name | Date |
|---|---|---|
| 1,352,898 | Houck | Sept. 14, 1920 |
| 1,442,769 | Jackson et al. | Jan. 16, 1923 |
| 1,537,457 | Bryan | May 12, 1925 |
| 2,238,764 | Wolf | Apr. 15, 1941 |
| 2,405,299 | Godwin | Aug. 6, 1946 |
| 2,408,862 | Lisota | Oct. 8, 1946 |

FOREIGN PATENTS

| Number | Country | Date |
|---|---|---|
| 338,353 | Italy | May 31, 1936 |
| 229,723 | Great Britain | Mar. 2, 1925 |
| 588,133 | France | Jan. 27, 1925 |